US007167575B1

(12) United States Patent
Nichani et al.

(10) Patent No.: US 7,167,575 B1
(45) Date of Patent: Jan. 23, 2007

(54) VIDEO SAFETY DETECTOR WITH PROJECTED PATTERN

(75) Inventors: Sanjay Nichani, Natick, MA (US); Robert Wolff, Sherborn, MA (US); William Silver, Weston, MA (US); David A. Schatz, Needham, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/563,011

(22) Filed: Apr. 29, 2000

(51) Int. Cl.
*G06K 9/00* (2006.01)

(52) U.S. Cl. ...................... 382/103; 382/173; 382/264; 348/143; 348/152

(58) Field of Classification Search ................ 382/103, 382/104, 107, 154, 173, 204, 221, 264, 275; 348/152, 143
See application file for complete search history.

(56) References Cited

U.S. PATENT DOCUMENTS

| | | | | |
|---|---|---|---|---|
| 3,686,434 | A | 8/1972 | Lemelson | |
| 3,811,010 | A | 5/1974 | Long | |
| 3,816,648 | A | 6/1974 | Noll et al. | |
| 3,858,043 | A | 12/1974 | Sick et al. | |
| 4,198,653 | A | 4/1980 | Kamin | |
| 4,236,180 | A | 11/1980 | Cayzac | |
| 4,249,207 | A | 2/1981 | Harman et al. | |
| 4,458,266 | A | 7/1984 | Mahoney | |
| 4,970,653 | A | 11/1990 | Kenue | 364/461 |
| 5,075,864 | A | 12/1991 | Sakai | 364/450 |
| 5,097,328 | A | 3/1992 | Boyette | |
| 5,208,750 | A | 5/1993 | Kurami et al. | 364/424 |
| 5,212,547 | A | 5/1993 | Otsuki | |
| 5,245,422 | A | 9/1993 | Borcherts et al. | |
| 5,301,115 | A | 4/1994 | Nouso | 364/460 |
| 5,528,703 | A | 6/1996 | Lee | |
| 5,529,138 | A | 6/1996 | Shaw et al. | 180/169 |
| 5,555,312 | A | 9/1996 | Shima et al. | 382/104 |
| 5,577,130 | A | 11/1996 | Wu | |
| 5,579,444 | A | 11/1996 | Dalziel et al. | |
| 5,581,250 | A | 12/1996 | Khvilivitzky | 340/961 |
| 5,589,928 | A | 12/1996 | Babbitt et al. | |
| 5,629,522 | A * | 5/1997 | Martin et al. | 250/338.4 |
| 5,642,106 | A | 6/1997 | Hancock et al. | 340/988 |

(Continued)

FOREIGN PATENT DOCUMENTS

JP 01-232497 * 9/1989

OTHER PUBLICATIONS

Karim Nice and Gerald Jay Gurevich, "How Digital Cameras Work", from the website "howstuffworks.com".*

(Continued)

*Primary Examiner*—Bhavesh M. Mehta
*Assistant Examiner*—Patrick Edwards
(74) *Attorney, Agent, or Firm*—Brian Michaelis

(57) ABSTRACT

A two-dimensional (2-D) machine-vision safety-solution involving a method and apparatus for performing high-integrity, high efficiency machine vision. A known structured lighting texture pattern is projected upon a target area. A model image of the pattern on an empty target field is stored during an initial training step. The machine vision safety solution digitally interprets a camera image of the light reflected by the objects in the target area to detect and characterize a pattern in the image. The pattern characterization is then processed to determine if a distortion of the characterization factors is larger than a predetermined threshold, and results in an alarm condition.

17 Claims, 4 Drawing Sheets

U.S. PATENT DOCUMENTS

| | | | | |
|---|---|---|---|---|
| 5,706,355 | A | 1/1998 | Raboisson et al. | 382/104 |
| 5,734,336 | A | 3/1998 | Smithline | |
| 5,742,504 | A | 4/1998 | Meyer et al. | |
| 5,757,287 | A * | 5/1998 | Kitamura et al. | 340/937 |
| 5,765,054 | A | 6/1998 | Uchiyama | |
| 5,801,785 | A | 9/1998 | Crump et al. | |
| 5,832,134 | A | 11/1998 | Aviaash et al. | |
| 5,870,220 | A | 2/1999 | Migdal et al. | |
| 5,917,936 | A | 6/1999 | Katto | |
| 5,917,937 | A | 6/1999 | Szeliski et al. | 382/154 |
| 5,956,424 | A * | 9/1999 | Wootton et al. | 382/192 |
| 5,961,571 | A | 10/1999 | Gorr et al. | 701/207 |
| 5,973,732 | A | 10/1999 | Guthrie | |
| 5,974,192 | A | 10/1999 | Kundu | |
| 6,127,926 | A | 10/2000 | Dando | |
| 6,324,296 | B1 * | 11/2001 | McSheery et al. | 382/107 |
| 6,546,115 | B1 * | 4/2003 | Ito et al. | 382/100 |
| 6,819,353 | B1 * | 11/2004 | Heyden | 348/143 |

OTHER PUBLICATIONS

J.H. McClellan, et al., *DSP First —A Multimedia Approach*, Prentice Hall, Section 5: pp. 119-152 & Section 8: pp. 249-311.

R.C. Gonzalez, et al., *Digital Image Processing —Second Edition*, Chapter 7: pp. 331-388.

Umesh R. Dhond et al., *IEEE Transactions on Pattern Analysis and Machine Intelligence*, "Stereo Matching in the Presence of Narrow Occluding Objects Using Dynamic Disparity Search", vol. 17, No. 7, Jul. 1995, one page.

*Scientific Technologies Inc.*, "Theory of Operation and Terminology", pp. A50-A54.

*Scientific Technologies Inc.*, "Safety Strategy", pp. A24-A30.

*Scientific Technologies Inc.*, "Safety Standards for Light Curtains" pp. A14-A15.

Web document,, "FlashPoint 128", web site: www.integraltech.com/128OV.htm, picked as of Nov. 9, 1999, 2 pages.

Umesh R. Dhond et al., *IEEE Transactions on System*, "Structure from Stereo—A Review", vol. 19, No. 6, Nov./Dec. 1989.

S.B. Pollard, et al., *Perception*, :PMF: A Stereo Correspondence Algorithm Using a Disparity Gradient Limit, 14:449-470; 1985.

L. Vincent, et al., *IEEE Transactions on Pattern Analysis and Machine Intelligence*, "Watersheds in Digital Spaces: An Efficient Algorithm Based on Immersion Simulations", 13(6):583-598, 1991.

Web document, "Capacitive Proximity Sensors", web site: www.theproductfiner.com/sensors/cappro.htm, picked as of Nov. 3, 1999, one page.

Web document, "The Safety Light Curtain", web site: www.theproductfinder.com/sensors/saflig.htm, picked as of Nov. 3, 1999, one page, Web document, "WV 601 TV/FM", web site: www.leadtek.com/wv601.htm, picked as of Nov. 9, 1999, 3 pages.

Web document, "Product Information", web site: www.imagraph.com/products/IMAproducts-1e4.htm, picked as of Nov. 9, 1999, one page.

Web document, "Compatible Frame Grabber List", web site: www.masdkodak.com/frmegrbr.htm, picked as of Nov. 9, 1999, 6 pages.

Web document, "FlashPoint 128", web site: www.integraltech.com/128OV.htm, picked as of Nov. 9, 1999, 2 pages.

Umesh R. Dhond et al., IEEE Transactions of System, "Structure from Stereo—A Review", vol. 19, No. 6, Nov./Dec. 1989.

S.B. Pollard, et al., Perception, "PMF: A Stereo correspondence Algorithm Using a Disparity Gradient Limit", 14:449-470; 1985.

L. Vincent, et al., IEEE Transactions on Pattern Analysis and Machine Intelligence, "Watersheds in Digital Spaces: An Efficient Algorithm Based on Immersion Simulations", 13(6): 583-598, 1991.

Umesh R. Dhond et al., IEEE Transactions on Pattern Analysis and Machine Intelligence, "Stereo Matching in the Presence of Narrow Occluding Using Dynamic Disparity Search", vol. 17, No. 7, Jul. 1995, 719-724.

Scientific Technologies Inc., "Theory of Operation and Terminology", pp. A50-A54.

Scientific Technologies Inc., "Safety Standards for Light Curtains" pp. A14-A15.

Scientific Technologies Inc., "Safety Strategy", pp. A24-A30.

Web document, "PLS Proximity Laser Scanner Applications", web site: www.sickoptic.com/safapp.htm, picked as of Nov. 4, 1999, 3 pages.

Web document, "New Dimensions in Safeguarding", web site: www.sickoptic.com/plsscan.htm, picked as of Nov. 3, 1999, 3 pages.

Web document, "Special Features", web site: www.sickoptic.com/msl.htm, picked as of Nov. 3, 1999, 3 pages.

J.H McClellan, et al., DSP First—A Multimedia Approach, Prentice Hall, Section 5: pp. 119-152 & Section 8: pp. 249-311.

R.C. Gonzalez, et al., Digital Image Processing—Second Edition, Chapter 7: pp. 331-388.

* cited by examiner

VIDEO SAFETY DETECTOR WITH PROJECTED PATTERN

FIELD OF THE INVENTION

The present invention relates to safety/security systems, and more particularly to an automated system for observing an area for objects intruding upon a safety/security zone.

BACKGROUND OF THE INVENTION

Industrial safety requires protection of operators, maintenance personnel, and bystanders from potential injuries from hazardous machinery or materials. In many cases the hazards can be reduced by automatically sounding an alarm or shutting off a process when dangerous circumstances are sensed, such as by detection of a person or object approaching a dangerous area. Industrial hazards include mechanical (e.g., crush, shear, impalement, entanglement), toxic (chemical, biological, radiation), heat and flame, cold, electrical, optical (laser, welding flash), etc. Varying combinations of hazards encountered in industrial processing can require numerous simultaneous safeguards, increasing capital expenses related to the process, and reducing reliability and flexibility thereof.

Machine tools can be designed with inherent safety features. Alternatively, hazards of machines or materials may be reduced by securing an enclosed machine or portions of the adjacent processing area during hazardous production cycles. Mechanical switches, photo-optical light-curtains and other proximity or motion sensors are well known safety and security components. These types of protection have the general disadvantage of being very limited in their ability to detect more than a simple presence or absence (or motion) of an object or person. In addition, simple sensors are typically custom specified or designed for the particular machine, material, or area to be secured against a single type of hazard. Mechanical sensors, in particular, have the disadvantage of being activated by unidirectional touching, and they must often be specifically designed for that unique purpose. They cannot sense any other types of intrusion, nor sense objects approaching nearby, or objects arriving from an unpredicted direction. Even complicated combinations of motion and touch sensors can offer only limited and inflexible safety or security for circumstances in which one type of object or action in the area should be allowed, and another type should result in an alarm condition. Furthermore, such increased complexity reduces reliability and increases maintenance costs—a self-defeating condition where malfunctions can halt production.

It is known to configure a light curtain (or "light barrier") by aligning a series of photo-transmitters and receivers in parallel to create a "curtain" of parallel light beams for safety/security monitoring. Any opaque object that blocks one of the beams will trigger the photo-conductive sensor, and thus sound an alarm or deploy other safety measures. However, since light beams travel in straight lines, the optical transmitter and receiver must be carefully aligned, and are typically found arranged with parallel beams. These constraints dictate that light curtains are usually limited to the monitoring of planar protection areas. Although mirrors may be used to "bend" the beams around objects, this further complicates the design and calibration problems, and also reduces the safe operating range.

One major disadvantage of a light-curtain sensor is that there is a minimum resolution of objects that can even be detected, as determined by the inter-beam spacing. Any object smaller than the beam spacing could penetrate the "curtain" (between adjacent beams) without being detected. Another disadvantage is that the light curtain, like most point-sensors, can only detect a binary condition (go/no-go) when an object actually interrupts one or more beams. Objects approaching dangerously close to the curtain remain undetected, and a fast-moving intruding object might not be detected until too late, thus forcing the designers to physically position the curtains farther away from the danger areas in order to provide the necessary time-interval for activating safety measures. For large machines this would deny access to large adjacent areas, or require physical barriers or other alarm sensors to provide the requisite security. In addition, the safe operating range between the photo-transmitter and corresponding receiver can be severely limited in cases where chips, dust, or vapors cause dispersion and attenuation of the optical beam, or where vibrations and other machine movements can cause beam misalignment.

Furthermore, light curtains are susceptible to interference from ambient light, whether from an outside source, or reflected by a nearby object. This factor further limits the applications, making use difficult in locations such as outdoors, near welding operations, or near reflective materials. In such locations, the optical receivers may not properly sense a change in a light beam. Still further, light curtains are often constructed with large numbers of discrete, sensitive, optical components that must be constantly monitored for proper operation to provide the requisite level of safety without false alarms. It is axiomatic that system reliability is reduced in proportion to the number of essential components and the aggregation of their corresponding failure rates. Microwave curtains are also available, in which focused microwave radiation is sent across an area to be protected, and changes in the energy or phasing at the distant receiver can trigger an alarm event. Microwave sensors have many of the same disadvantages of light curtains, including many false alarm conditions.

Ultrasonic sensor technologies are available, based upon emission and reception of sound energy at frequencies beyond human hearing range. Unlike photoelectric sensing, based upon optically sensing an object, ultrasonic sensing depends upon the hardness or density of an object, i.e., its ability to reflect sound. This makes ultrasonic sensors practical in some cases that are unsuitable for photoelectric sensors, however they share many common disadvantages with the photoelectric sensors. Most significantly, like many simple sensors, the disadvantages of ultrasonic sensors include that they produce only a binary result, i.e., whether or not an object has sufficiently entered the safety zone to reach a threshold level. Similar problems exist for passive infrared sensors, which can only detect presence or absence of an object radiating heat, typically based upon pyroelectric effects, that exceeds a predetermined threshold value. Such heat sensors cannot be used effectively near machines that generate heat or require heat, or where ambient sunlight may interfere with the sensor.

Video surveillance systems having motion detection sensors are also known for automatically detecting indications of malfunctions or intruders in secured areas. These types of known sensors are limited to the simple detection of change in the video signal caused by the perceived movement of an object, perhaps at some pre-defined location (e.g., "upper left of screen"). Analog video surveillance systems are susceptible to false alarms caused by shadows coming into view that cannot be distinguished from objects.

Furthermore, in video motion detectors available in the prior art, a low-contrast object can enter the area without triggering an alarm. Such systems also require sufficient ambient light to uniformly illuminate the target area in order to properly view the intruding objects. Additional lighting can cause its own problems such as reflections that affect the workers, machines or other sensors, or cause shadows that impinge upon adjacent safety areas and cause false alarms. These and other disadvantages restrict the application of analog video surveillance systems, like the mechanical switch sensors, to simple applications, or where combined with other sensor types.

More recently, proximity laser scanners (PLS) have been used to detect objects within a defined area near the PLS sensor. These systems are also known as Laser Measurement Systems (LMS). The PLS technology uses a scanning laser beam and measures the time-of-flight for reflected light to determine the position of objects within the viewing field. A relatively large zone, e.g., 50 meter radius over 180 degrees, can be scanned and computationally divided into smaller zones for early warnings and safety alarm or shutdown. However, like many of the other sensor technologies, the scanning laser systems typically cannot distinguish between different sizes or characteristics of objects detected, making them unsuitable for many safety or security applications where false alarms must be minimized.

Significantly, the scanning laser systems typically incorporate moving parts, e.g., for changing the angle of a mirror used to direct the laser beam. Such moving parts experience wear, require precision alignment, are extremely fragile and are thus unreliable under challenging ambient conditions. Even with a system that uses fixed optics for refraction or diffraction fields, the components are fragile and susceptible to mis-alignment. Another disadvantage of such systems is that they generally have a flat field of view that must be arranged horizontally to protect an adjacent floor area. This leads to multiple problems, including being susceptible to physical damage or bumping, which increases false alarms and maintenance. Furthermore, the protected area is theoretically infinite, thus requiring the use of solid objects or screens to limit the protected area for applications near other moving objects.

3-D video safety implementations are known. In such implementations, stereopsis is used in determining a 3-D location of an object with respect to cameras, or a defined reference point. A 3-D difference can then be derived and compared with a model view. However, to locate objects in 3-D space requires a binocular (or trinocular) image set. It also may increase the cost and maintenance of equipment. In addition, 3-D calculations for matching and determining alarms conditions may be time consuming. For an application where the camera is mounted overhead to view a target, the area within view is conical and the first part of a person coming into view would be very close to the floor (i.e., the feet), making it more difficult and error-prone to quickly detect as a height difference above the floor. To obtain the necessary coverage, the cone needs to be larger, the camera needs to be higher from the floor, and the image resolution is thus disadvantageously diminished. With the larger cone of vision, the potential false alarm rate is also increased. These disadvantages may accumulate to such an extent that the system is not reliable enough for use in applications for protecting severe hazards where false alarms or false positives cannot be tolerated.

SUMMARY OF THE INVENTION

The present invention provides a two-dimensional (2-D) machine-vision safety-solution involving a method and apparatus for performing high-integrity, high efficiency machine vision. A structured lighting texture is projected with near-infrared (IR) light upon the target area and a camera receives an image of the area thus illuminated. A model of the pattern on an empty target field is stored during an initial training step. Alternatively, a filtered time-series of images can be developed as a model against which to measure subsequent changes. When an object intrudes upon the target area, a part of the pattern will be projected on the object rather than the empty target field, and the pattern thus becomes distorted. The image of the target is captured and processed to detect the pattern. The pattern is then processed to determine if it substantially corresponds to the desired pattern when no intruder was present. If the pattern is distorted beyond a configurable threshold, then an object has been detected and an alarm condition is set.

An object, multiple objects, or an area being monitored are collectively called the "target" for purpose of discussion. The target is being protected from encroachment by another foreign object, called the "intruder." For the purpose of the illustrative embodiment, an intruder object includes any object that moves within the area being viewed. On the other hand, non-moving objects that are within view during the initial model image setup can be deemed "background" by the system. This automatically permits the system operators to change the background prior to switching on the safety system, without having to reconfigure the safety system parameters manually.

According to the invention, the 2-D machine-vision safety-solution apparatus includes an image acquisition device such as one or more video cameras, or digital cameras, arranged to view light reflected or emitted from a target scene, such as a safety zone near a dangerous machine. The cameras pass the resulting video output signal to a computer for further processing. The video output signal is connected to the input of a video processor adapted to accept the video signal, such as a "frame grabber" subsystem. Time-sequenced video images from the camera are then synchronously sampled, captured, and stored in a memory associated with a general-purpose computer processor. The digitized image in the form of pixel information can then be stored, manipulated and otherwise processed in accordance with capabilities of the vision system.

The digitized images are accessed from the memory and processed according to the invention, under control of a computer program. In further accord with the invention, the machine-vision safety solution method and apparatus involves processing of a digitized image to determine the arrangement of a light pattern in the image, and post-processing to determine if the arrangement matches the pattern expected when no intruder object is present in the target area. The results of the processing are then stored in the memory, or may be used immediately to activate other processes and apparatus adapted for the purpose of taking further action, depending upon the particular industrial application of the invention.

Structured light is defined as the process of illuminating an object at a known angle with a specific light pattern. Observing the lateral position of the image can be useful in determining the depth information. For example, if a line of light is generated and viewed obliquely, the distortions in the lines can be translated into height variations. This is the basic principle behind depth perception of machines, or 3D vision. Illuminating an object with structured light and looking at the way the light structure is changed by the object gives us information on the 3D shape of the object. In one embodiment of the invention, the light source operates in the near-IR spectrum. This implementation would have the advantage of removing the textured pattern from human sight without sacrificing system functionality.

In an alternative embodiment of the invention, the source of illumination for projecting the structured lighting pattern on the target area may be implemented using any other type of monochromatic light. The camera lens can then be filtered with a bandpass filter corresponding to the frequency of the light source being used.

In another alternative embodiment in accord with the invention, the machine-vision safety solution method and apparatus involves capture of a series of images and storing them in memory buffer. A filtered image is created by taking the buffered samples of the video scene and running them through a pixel-oriented low-pass filter. A low-pass filter is designed to prevent high-frequency noise, such as vibrations and flickering light, from creating changes in the model image. Each pixel is digitally filtered against the corresponding pixel over a predetermined number of prior images. The filtered image is then compared with each new image to be tested to determine if there have been any sudden changes in the image of the viewed area, the combination thus operating as a high-pass filter. Sudden changes will happen if the pattern is distorted by an intruder. These changes are detected by the high-pass filter and then processed to determine how large the changes were. A change large enough to exceed a threshold level results in an alarm condition being reported.

One of the major advantages of the 2-D video motion detector implemented according to the invention is its geometry. By looking top-down on a scene where intruders may enter, there are several advantages:

(i) the structured light can be projected on a fixed plane, which is needed for the application to properly work, since it makes the pattern regular;

(ii) a single camera-lighting fixture could be used such that the whole area is uniformly lit and viewed. Therefore, the detection capability (sensitivity) is uniform across the target area and (iii) it allows the setting of precise target regions that need to be protected. This is done either using visible markers on the floor during a setup procedure or by a graphical user interface overlaid on the image Intruding objects can be determined according to the invention without using sensors that must be specially designed, placed, or calibrated for each different type of object to be protected. The system does not rely upon any moving mechanical parts subject to the rigors of wear and tear. It is not necessary for the invention to be placed very close to, or in contact with the hazard, as would be necessary for mechanical sensors. Machine vision systems offer a superior approach to security and safety sensors by processing images of a scene to detect and quantify the objects being viewed. Machine vision systems can provide, among other things, an automated capability for performing diverse inspection, location, measurement, alignment and scanning tasks. In addition, the operation is largely immune from problems caused by small contrast differential between the object and the background.

Another feature of the invention is the ability to discriminate shadows from objects, to avoid false alarms. In addition, the use of a near-IR light source offers the feature of additional illumination without the drawbacks of visible light, such as reflections, or visible texture on the floor or other objects in the target area. Similarly, near-IR is completely invisible and can be operated in what would otherwise appear to humans to be total darkness. Another feature of the invention is the ability to automatically store (and archive) digitized images of the scene in which an infraction of the safety or security rules existed, for later review.

BRIEF DESCRIPTION OF THE DRAWINGS

These and other features of the present invention will be better understood in view of the following detailed description taken in conjunction with the drawings, in which.

DETAILED DESCRIPTION

Figure 1:
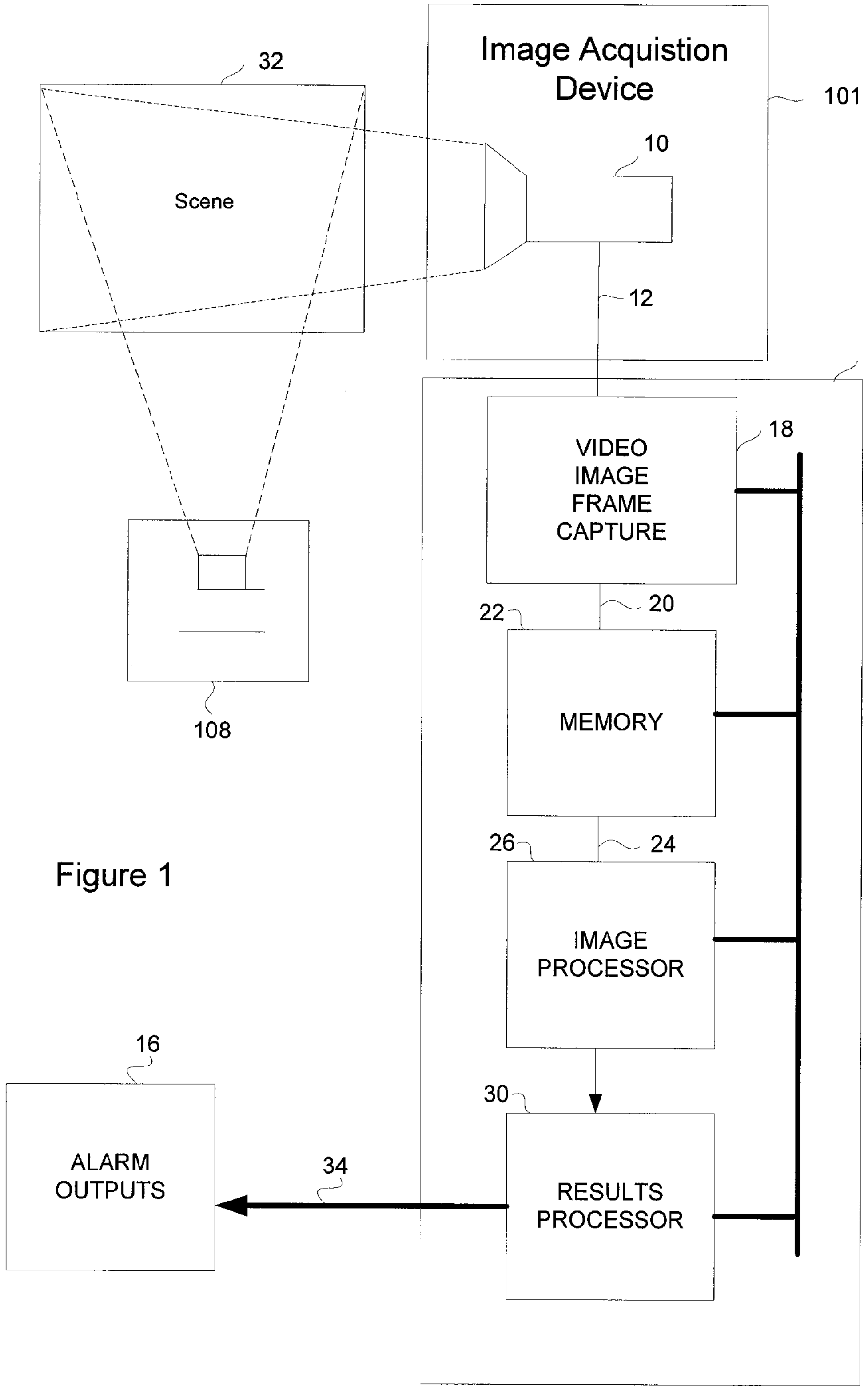
FIG. 1 is a functional block diagram of a video safety system, according to the invention.

A vision system implemented in a security and safety embodiment according to the invention is illustrated in FIG. 1. The system incorporates an image acquisition device 101, comprising at least one camera 10, and a projector 108 for illuminating a viewed area with a prescribed pattern. The camera 10 sends a video signal via signal cable 12 to a video safety and security processor 14. The camera 10 is focused on a scene 32 to be monitored. The video safety and security processor 14 includes a video image frame capture device 18, image processor 26, and results processor 30, all of which are connected to a memory device 22.

Generally, digitized video images 20 from the video image capture device 18, such as a 8100 Multichannel Frame Grabber available from Cognex Corp, Natick, Mass., or other similar device, are stored into the memory device 22. The image processor 26, implemented in this illustrative embodiment on a general-purpose computer processor, receives the stored digitized video images 24 and delivers them to the results processor 30 which generates results data 34, as described in detail hereinafter. The results data 34 effect results as a function of the application, and may, for example, be fed to the alarm output 16.

In operation, the video signals from the image acquisition device 101 are digitized by the video image frame capture device 18, and stored into the memory device 22 for further processing. The video image frame capture device 18 includes digitizing circuitry to capture the video image input from the image acquisition device 101 and convert it at a high resolution to produce a digital image representing the two-dimensional scanned video image as a digital data set. Each data element in the data set represents the light intensity for each corresponding picture element (pixel). The digitized image generated from the camera is temporarily stored in memory 22 as it awaits further processing.

Figure 2:
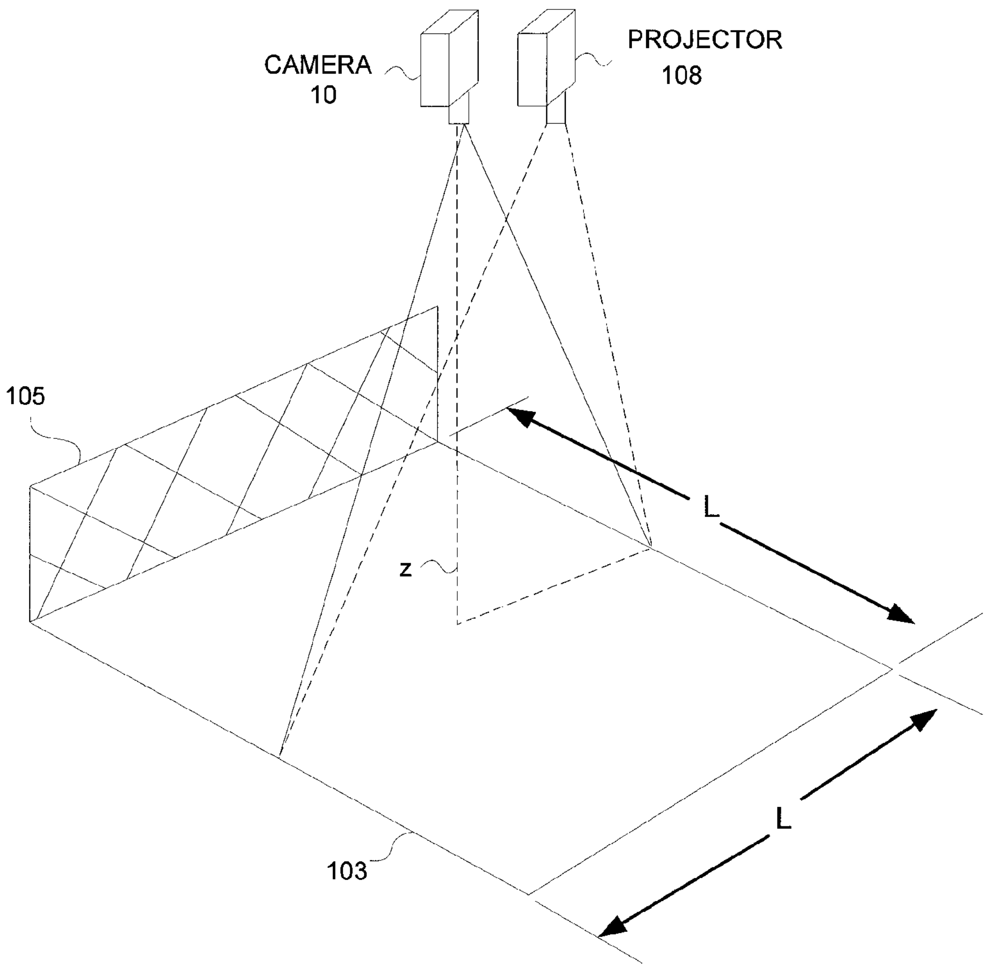
FIG. 2 is an illustration of a camera arrangement adapted for use in acquiring images for processing according to the invention.

The image acquisition device 101 in the illustrative embodiment comprises an arrangement, as illustrated in FIG. 2, for acquiring image information. In the illustrative arrangement, a camera 101 is mounted above a target area 103 adjacent to a hazardous area 105. The geometry of the camera mounting height Z above the target area is determined by the size of the target area, the focal length of the camera, and the size of the CCD. In an illustrative embodiment, a lens of f=1.8 mm is used with a charge-coupled device (CCD) image transducer ⅓ of an inch square. This permits viewing a square target area with a side L of 8 meters from a height of 3 meters. The corresponding pixel size, assuming 640 pixels across the CCD device, can be calculated as 12.5 mm. Given a desired resolution for a 150 mm object at the level of the target area (i.e., the floor), this means that 12 pixels would be changed at the floor level, or 24 pixels at half the distance to the floor, 1.5 meters high.

Two primary constraints imposed by the application are the size of the area protected and the maximum permitted speed of an object to be detected. The desired system response time for initiating an alarm can then be determined, since a moving object must not travel from the perimeter of the target area to the hazardous zone before safety steps can be completed. A realistic maximum for object velocity is dictated by the application. The estimation of system response time has to take into consideration the time necessary to capture, transmit, and process the image in which the object first appears outside the target perimeter, in order to properly issue the alarm condition. In an illustrative embodiment, the camera acquires and integrates an image at 30 Hz, or 33.33 ms (referred to as time A) and the acquired image is digitized in another 33.33 ms. A processing engine having a processing time of 33.33 ms is also implemented. Therefore, if a number of images (n) must be captured, digitized and processed, the minimum response time is (n+2)A, or 100 ms for a single frame. However, in an illustrative embodiment, the number of frames necessary for proper operation may be as many as 4, giving a worst-case response time of 200 ms. The distance traveled by the maximum-speed object in the actual response time is 340 mm. Since the viewed area is 8 m sq., the actual hazardous zone is thus 7.32 m sq.

Structured light is defined as the process of illuminating an object at a known angle with a specific light pattern. Observing the lateral position of the image can be useful in determining the depth information. For example, if a line of light is generated and viewed obliquely, the distortions in the lines can be translated into height variations. This is the basic principle behind depth perception of machines, or 3-D vision. Illuminating an object with structured light and looking at the way the light structure is changed by the object gives us information on the 3-D shape of the object.

A pattern projector 108 may be implemented as an infrared (IR) source with a lens, filter, or similar means for projecting the desired pattern upon the scene 103 to be monitored for object intrusions. The pattern can be a repetitive matrix such as a grid of dots or a mesh of lines, or any other pattern with regularized spacing. A useful pattern size is related to the resolution of the camera and the minimum object size to be detected. A useful matrix spacing for detection of a human foot would be no greater than approximately 10 cm. Alternatively, the projected pattern may be a line or multiple lines arranged parallel to each perimeter of the protected area. In any case, the pattern need only be projected in the critical area near the perimeter, rather than in the entire protected area. Multiple projectors can be implemented for purposes of redundancy, or for a more complex pattern, such that perturbations of the composite pattern by an intruder object can be more easily detected. In an illustrative embodiment, the projector is a Multiple Line Laser Projector, available in many patterns from Laseris, Inc., at 3549 Ashby, St-Laurent. Québec, Canada, H4R 2K3.

Figure 3:
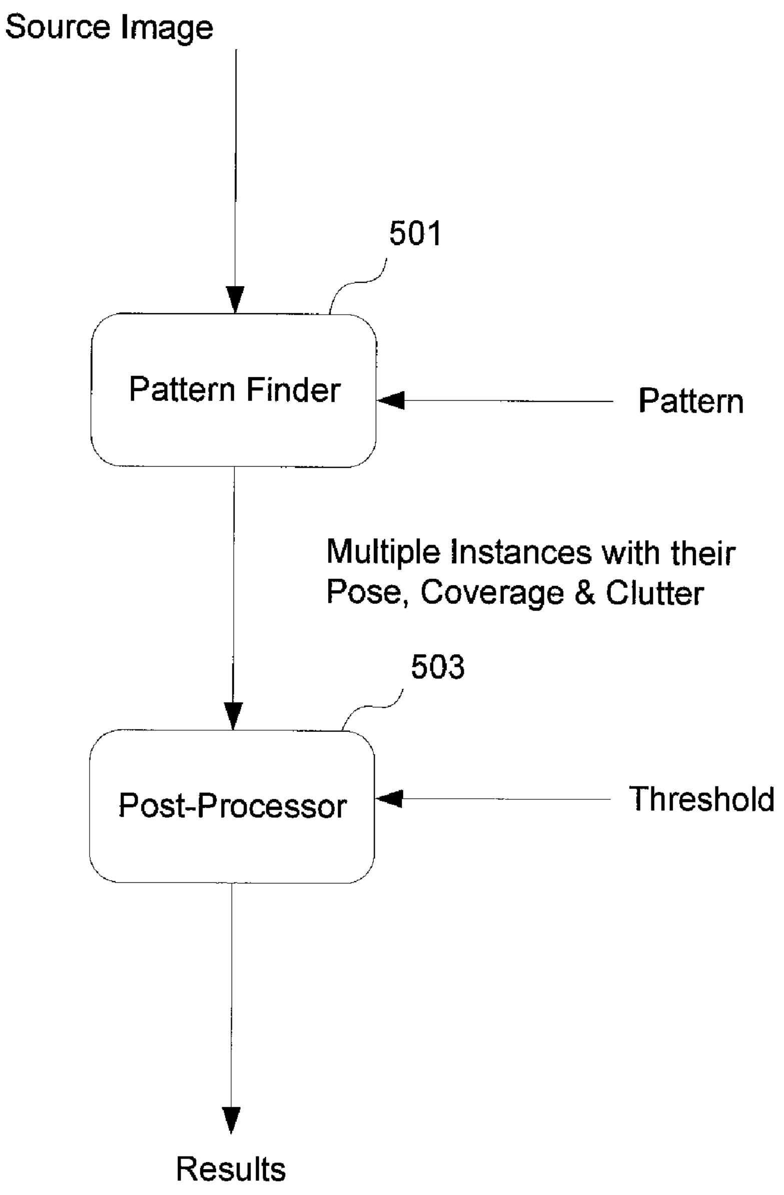
FIG. 3 is a flow diagram illustrating operation of the video safety system according to the invention.

FIG. 3 diagrams a system in which a source image would be processed by a pattern finder 501 in which the light reflected by objects in the target area would be processed to detect the pattern of light posed by the scene. The posed pattern output would then be output to a post-processor 503 for determining whether the pattern substantially matches the expected pattern, within a prescribed threshold value. When an intruder enters the perimeter portions of the projected pattern will distort based on the heights at which the light hits the intruder relative to the plane of the background. If the posed pattern fails to match the expected pattern, then an alarm condition would be the result. This implementation would overcome the disadvantages of other systems that are susceptible to false alarms from shadows caused by ambient light, since the shadow would not distort the pattern reflected back to the image acquisition device. Furthermore, this implementation would be able to detect intruder objects having a low contrast, with respect to the target background (i.e., the floor). Even a black object against a black background would cause the projected pattern to become distorted. Similarly, a highly reflective object, such as a mirror reflecting the background would cause at least some of the projected pattern to change in the source image.

Generally, when projecting a structured light, one assumes that the background that it projects is not completely absorptive (image will be all black) or is not too reflective (image will be all white, if there are other sources of radiation at that wavelength). For example if a red laser stripe is being projected, and the background is all red, a red filter is used on the camera, and there is not enough ambient light, then the pattern will be invisible to the camera.

When using IR, absorptivity is not an issue and reflectivity is less serious than in the case of visible light because there are fewer other sources of interfering radiation, although there may be some. For example, if a background is very reflective to IR, and there is another source of IR (e.g., sun or an incandescent lamp) the whole background will be bright completely wash out the structured pattern. Proper setup of the background is thus an important consideration.

Note that once an appropriate background is selected, following the loose guidelines mentioned above, the intruder object will always be detected, regardless of its contrast with respect to the background. This is because the intruder will (in most cases) distort the pattern. In other cases it will either cause the pattern to be missing (if the intruder absorbs all radiation). On the other hand, it will completely obliterate the pattern by saturating, if it is too reflective and there are other sources of radiation present at the same wavelength.

It should be noted that many applications are safety related rather than perimeter security against malicious intruders. Therefore, a reasonable system design need only accommodate anticipated safety scenarios and not every possible means for defeating the system. For example, it may not be necessary to detect a person using a long pole or throwing a high-speed projectile with the intent to sabotage a machine.

Figure 4:
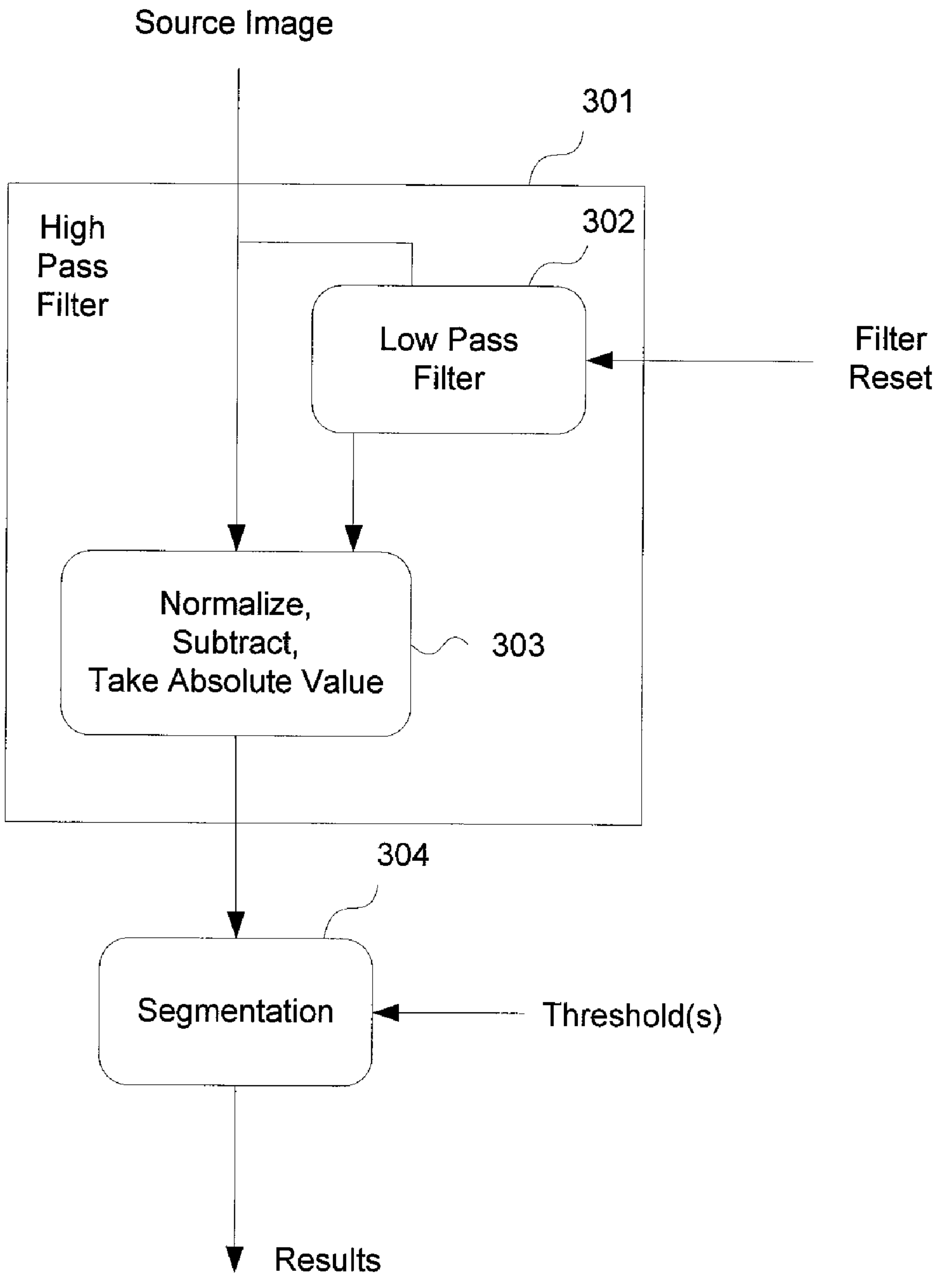
FIG. 4 is a flow diagram illustrating operation of an alternative embodiment of the video safety system according to the invention.

There are two algorithms one could use: a geometric pattern finding tool, as diagramed in FIG. 3 or a filtering algorithm, as diagrammed in FIG. 4, which implements a high pass filter followed by segmentation, which when applied here will detect distortion as high-frequency changes.

In an illustrative embodiment of the invention, a digitized source image is fed to high-pass filter 301 and the filtered output is further processed for segmentation 304. As used in this application, the high frequency filter image will contain areas where the intruder object has changed with respect to the background, and will not necessarily be limited to distorted pattern points. The magnitude of the segmentation result is evaluated to generate the alarm results, as further described below.

A pre-processing procedure is used to detect when there is not enough light to create a valid source image of the projected, such as when a lens-cap is placed on the camera, or there is insufficient light from the projector for operating the system. FIG. 4 is a diagram of an illustrative embodiment of the invention in which a source image is fed to high-pass filter 301 and the filtered output is further processed for segmentation 304 to generate the alarm results. The high-pass filter 301 further comprises a resettable low-pass filter 302 including a reset function which resets the previous inputs and outputs to zero. Each data element of sequentially captured images is compared with corresponding elements of a digitally filtered image of a number of previous captures, in order to determine the cumulative magnitude of contiguous changes. The model image from the low-pass filter is then compared against the latest source image, using a digital subtraction step 303 and the absolute value of a change is produced as the output of the high-pass filter. These conditions can be forwarded directly to the operator in the form of system malfunction warning indicators, or system fail-safe shutdown, or other results dictated by the application.

The low-pass filter 302 creates an image by evaluating a fixed number of previous input and output images. The number of images depends upon the order of the filter. Each pixel is the input to a digital signal processing filter that includes internal feedback and weighting factors. The filter output depends upon the current input, the previous inputs, and the previous outputs. Such filters are known in the art, such as described by James H. McClellan, Ronald W. Schafer and Mark A. Yoder in DSP First: A Multimedia Approach, Prentice Hall, which is incorporated herein by reference. In an illustrative embodiment, a first-order recursive IIR (infinite impulse-response) filter that has the following filter equation:

$$y(n)=(1-k)*y(n-1)+(k)*x(n)$$

where y(n) is the low pass filtered output pixel in the current frame n y(n−1) is the low pass filtered output pixel in the previous frame n−1 x(n) is the input pixel in the current frame n (Src)

k is the filter coefficient

Note that the filter co-efficient for x(n−1), the previous input, is zero and this factor is thus omitted from the equation.

The result of the low-pass filtering is an image of what the target scene contains, based upon the images previously captured and filtered. This filtered image becomes the stable baseline against which sudden changes are measured. A low-pass filtering arrangement as described removes much of the noise that occurs at high-frequencies, such as flickering lights, and machine vibrations, while simultaneously adapting to slow changes in the source images, such as a setting sun. Note that after each process cycle the oldest inputs and outputs are purged from the memory buffer to make way for the newest captured input and filter output.

Once a stable baseline image has been filtered and captured to create the currently valid model image in the low-pass filter, the next source image can be subtracted 303 from the model image to detect any pixels that changed from the model image. Prior to the subtraction it may be desirable to normalize the input image with respect to the low pass filtered output or vice-versa. The gray levels of the pixels in the high-pass image are proportional to the rate at which the scene being imaged changes with time. Because the system must detect objects that may be lighter or darker than the model image, an absolute value of the changes is also calculated and this becomes the output of the high-pass filter. In effect, any high-frequency change will be instantly passed through to the segmentation process 304.

The segmentation process 304 is used for determining the size of the change in the present source image when compared with the model image. Segmentation refers to the process of identifying pixels forming a contiguous area ("blob" analysis), and characterizing a blob according to its size. For the purpose of quickly recognizing a 150 mm object approaching a dangerous area, it is sufficient to identify the size of a contiguous blob of pixels that have changed, without any particular indication of its location in the scene. This process can be implemented by a number of methods known in the art, such as those described by Rafael C. Gonzalez and Paul Wintz in Digital Image Processing, Second Edition, from Addison-Wesley Publishing Company, which is incorporated herein by reference.

In an illustrative embodiment, segmentation may be performed very efficiently using a "watershed" process which quickly determines the location and size of a change by "filling in" valleys that appear between change gradients, as described in L. Vincent and P. Soille, "Watersheds in digital spaces: an efficient algorithm based on immersion simulations," IEEE Trans. Pattern Anal. Machine Intell., 13(6): 583–598, June 1991, which is incorporated herein by reference. The light intensity in pixels of a 2-D image is characterized by gradients, such as increasingly dark or light with respect to the neighboring pixels. Since the output of the high-pass is the absolute value of change from the model image, the segmentation is only concerned with the magnitude of change rather than direction of change.

Assume an image to be a topographical relief with gray levels at any point representing the depth at that point. Now imagine immersing this in a lake of water and piercing a hole at the minima where the valleys touch the water. The water starts filling up the "catchment basins". As soon as the water from one catchment basin is about to spill over to another catchment basin infinitely tall dams called watesheds are positioned at the overflow points. The labeled regions then correspond to the catchment basins and are then compared with a predetermined threshold based on the volume of "water" they can hold. By this or similar methods for detecting the size of a contiguous blob of changed pixels, the changed image is segmented into areas of change and non-change. The advantages of the watershed algorithm over blob analysis are numerous. First only a single volume threshold is used, secondly it uses a late threshold which means that a threshold is only used at the end of the procedure. Furthermore, watershed processing is based on a different criterion. In blob analysis two pixels belong to the same region if and only if they are connected and have a similar gray level value, whereas in the watershed approach they have to be connected and also any water that hits them must fall into the same catchment basin. Additional parameters associated with operation of the system can also be configured, such as the order of the low-pass filter, the minimum amount of light that must be observed in order to permit operation, areas of the target view which should be ignored, and the shape and size of the target area. Other generic parameters can also be included, such as those related to the safety mission of the system (e.g., test mode, display mode for viewing and adjusting the images), and the time of day during which other parameters may change.

In an alternative embodiment, shown in FIG. 3, one can use a geometric pattern-finding tool. A pattern finder process 501 generates a pattern result stream from a source image, including pose, coverage and clutter factors. The pattern "pose" factor for a specific instance indicates the translation, scale and rotation of the pattern in the run-time image relative to the trained pattern. The "coverage" factor is the percentage of the trained pattern that was found in the specific instance of a run-time pattern during intrusion detection. The "clutter" factor is the percentage of the specific instance of run-time pattern that was not present in the trained pattern. An example of a pattern finder, one could use implementations such as the MVS-8000 products running PatMax tools from Cognex Corporation, at One Vision Drive, Natick, Mass., or HexSight 2.0 from HexaVision at 1020 Route de l'Eglise, suite 200 Sainte Foy QC G1V 3V9. Ideally one would expect a 100 percent coverage and 0 percent clutter for each run-time instance where the pattern is unperturbed. Not finding an instance of the pattern or finding a pattern with low coverage and high clutter indicates possible occlusion.

To better understand how the second algorithm can be used, consider a grid of dots. A pattern finder would be used to find the nominal position of the dots. When an intruder approaches the area the dots that would necessarily fall on the intruder would be shifted from their nominal positions. The post-processor 503 then measures the deviation of each dot from its nominal position and flags an intrusion if the deviation exceeds a preset and configurable threshold. Alternatively, if there are multiple lines, the geometric pattern-finding tool can be used to locate the lines. When there is an intrusion a portion of the line or multiple lines will be shifted which will decrease the coverage value and increase the clutter value indicating an intrusion. This is again a job for the post-processor 503.

The advantages of the method used in this embodiment are numerous. There is always image contrast on an object with respect to the background, within limits as described above. Also, shadows from ambient light will not affect the pattern finding tool as it does not distort the projected pattern. The approach is also very simple to implement and further it does not rely on ambient illumination. The only major disadvantage is the relatively high cost of projecting a structured IR pattern with the precision and reliability necessary for a safety application.

Additional parameters associated with operation of the system can also be configured, such as the order of the low-pass filter, the minimum amount of light that must be observed in order to permit operation, areas of the target view which should be ignored, and the shape and size of the target area. Other generic parameters can also be included, such as those related to the safety mission of the system (e.g., test mode, display mode for viewing and adjusting the images), and the time of day during which other parameters may change.

Applications of the 2-D vision system will dictate the specific actions to be taken upon occurrence of an alarm condition. The alarm results from the vision system can be conveyed by numerous combinations of means known in the art for computer output, such as creating an electrical, optical or audible output or setting a software flag or interrupt for triggering other computer processes. For example, an electrical output can be connected to hazardous machinery such that a change in the electrical characteristics of the output will signal an alarm condition to the machinery shutdown process. Similarly, an alarm output can be used to trigger the instantaneous deployment of safety guard devices, trigger a warning bell, initiate emergency shutdown or quenching of the hazardous process, create a time-stamped record of the event in a computer log, and capture the digital image of the intruding object. Furthermore, an application may require comparison of other results from other sensors, or evaluation of the status of other processes prior to initiating irreversible actions. Multiple, serial or simultaneous alarm conditions may be necessary prior to taking further action in some applications.

In the interest of providing a fail-safe system, dual or multiple redundant and independent projectors, image acquisition devices and their corresponding processor, memory, and results apparatus can be supplied and operated simultaneously. The system would then be configured such that an intruder object detected by any of the multiple redundant video motion sensors would trigger the appropriate alarm condition.

Although the invention is described with respect to an identified method and apparatus for image acquisition, it should be appreciated that the invention may incorporate other data input devices, such as digital cameras, CCD cameras, or other imaging devices that provide high-resolution two-dimensional image data suitable for 2-D processing.

Similarly, it should be appreciated that the method and apparatus described herein can be implemented using specialized image processing hardware, or using general purpose processing hardware adapted for the purpose of processing data supplied by any number of image acquisition devices. Likewise, as an alternative to implementation on a general purpose computer, the processing described hereinbefore can be implemented using application specific integrated circuitry, programmable circuitry and the like.

Furthermore, although particular divisions of functions are provided among the various components identified, it should be appreciated that functions attributed to one device may be beneficially incorporated into a different or separate device. Similarly, the functional steps described herein may be modified with other suitable algorithms or processes that accomplish functions similar to those of the method and apparatus described.

Although the invention is shown and described with respect to an illustrative embodiment thereof, it should be appreciated that the foregoing and various other changes, omissions, and additions in the form and detail thereof could be implemented without changing the underlying invention.

What is claimed is:

1. A method of detecting an intruding object in a space comprising the steps of:

projecting a pattern onto at least part of said space;

acquiring a set of source images of said space, said source images comprising a set of data elements representing light intensity for each corresponding pixel including data representing said pattern and additional data representing objects in said space;

generating a background image by processing said source images using a low pass filter, said background image comprising an image of said space including said pattern and said objects, based upon images previously captured and filtered;

comparing a next source image with said background image using a digital subtraction step to form a difference image; and segmenting said difference image.

2. The method according to claim 1 wherein said steps of generating and comparing are part of a high pass filter process.

3. The method according to claim 2 wherein said high pass filter includes a resettable low pass filter having a reset function which resets previous outputs of said low pass filter to zero.

4. The method according to claim 1 further comprising the step of taking an absolute value of said difference image to form an absolute difference image.

5. The method according to claim 1 wherein said step of segmenting further comprises the steps of:

characterizing contiguous related pixels;

determining areas of contiguous related pixels; and comparing said areas with threshold limits.

6. The method according to claim 5 further comprising the step of providing notification output if one of said areas exceed said threshold limits.

7. The method according to claim 1 wherein said step of segmenting is performed using a watershed process.

8. The method according to claim 1:

wherein said step of projecting is performed using a monochromatic lighting pattern source; and wherein said step of acquiring is performed using an image acquisition device having a band-pass filter passing said monochromatic light to said image acquisition device.

9. The method according to claim 8:

wherein said monochromatic lighting pattern source is a near IR lighting pattern source.

10. The method according to claim 1 wherein said source image comprises a set of time sequenced images.

11. The method according to claim 1 wherein said pattern comprises a repetitive matrix.

12. The method according to claim 1 wherein said pattern comprises a set of regularly spaced lines.

13. The method according to claim 1 wherein said pattern is projected onto a fixed plane.

14. A machine vision intrusion detection apparatus comprising:

at least one image acquisition device arranged to acquire an image of a space;

at least one pattern projector arranged to project a structured lighting pattern onto at least part of said space;

at least one video processor in communication with said at least one image acquisition device;

wherein said at least one video processor further comprises:

an image processor component in communication with said image acquisition device;

wherein said image processor component further comprises a low pass filter component in communication with said image acquisition device and receiving a source image therefrom, said low pass filter providing a background image as a result of processing said source image;

wherein said source image comprises a set of data elements representing light intensity for each corresponding pixel including data representing said pattern and additional data representing objects in said space;

wherein said background image comprises an image of said space including said pattern and said objects, based upon images previously captured and filtered;

a comparison component in communication with said image acquisition device and receiving said source image therefrom, said comparison component also in communication with said low pass filter component and receiving a background image therefrom;

a segmentation component in communication with said comparison component and receiving a difference image therefrom; and a results processor in communication with said segmentation component.

15. The apparatus according to claim 14 wherein said at least one pattern projector comprises a monochromatic light pattern projector.

16. The apparatus according to claim 14 wherein said at least one pattern projector comprises a near IR structured light pattern projector.

17. The apparatus according to claim 16 wherein said image acquisition device is configured with an IR band-pass filter to acquire reflected near IR light and reject light outside of the near IR frequency band.

* * * * *